Dec. 1, 1959
C. B. VOGEL
2,915,738
HYDROPHONE DETECTOR
Filed Jan. 22, 1957
2 Sheets-Sheet 1
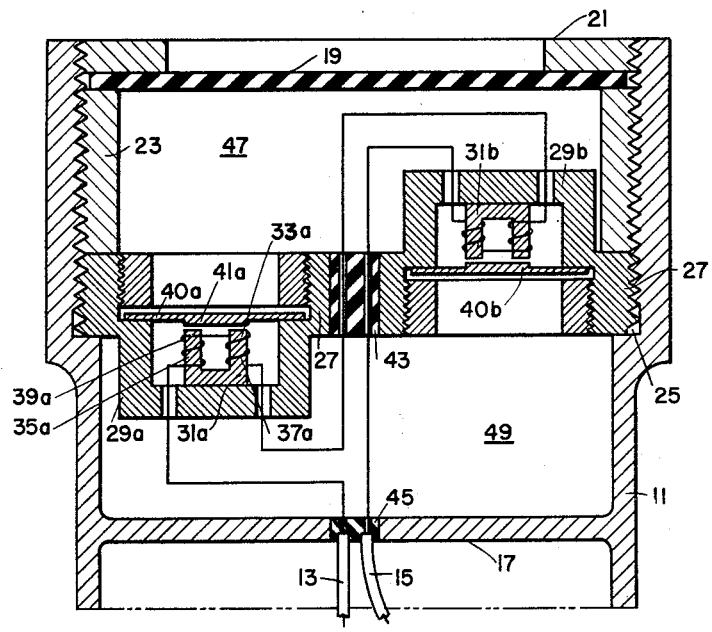
FIG. 1
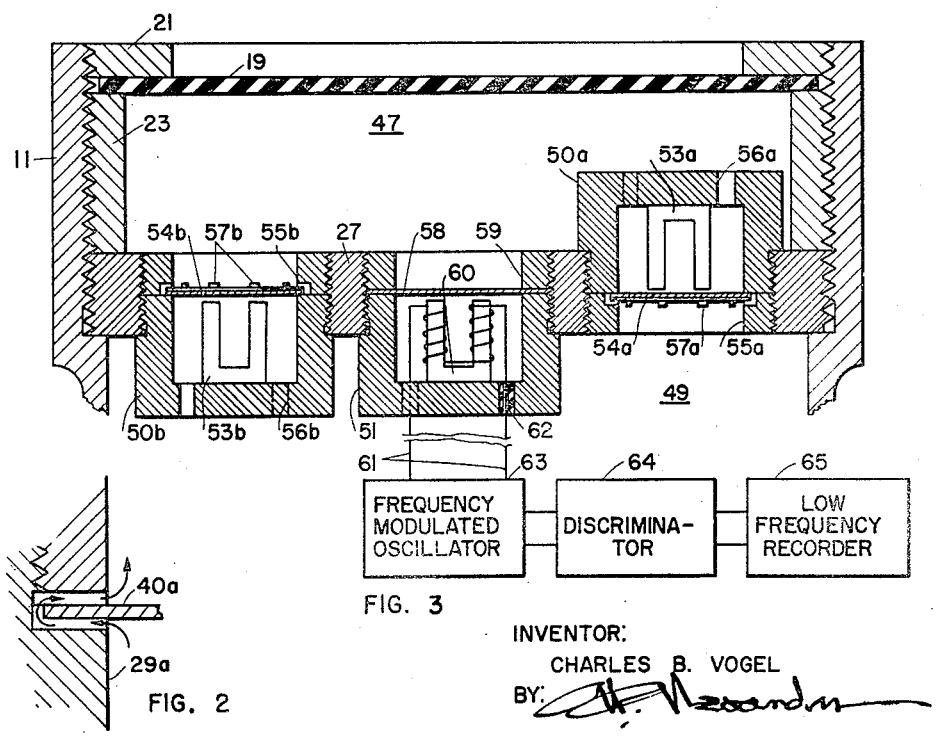
FIG. 3
FIG. 2
INVENTOR:
CHARLES B. VOGEL
BY:
HIS ATTORNEY

INVENTOR:
CHARLES B. VOGEL
BY:
HIS ATTORNEY

United States Patent Office 2,915,738
Patented Dec. 1, 1959

2,915,738

HYDROPHONE DETECTOR

Charles B. Vogel, Houston, Tex., assignor to Shell Development Company, New York, N.Y., a corporation of Delaware Application January 22, 1957, Serial No. 635,396

9 Claims. (Cl. 340—17)

This invention pertains to seismic hydrophones and detectors, and relates more particularly to hydrophones comprising an improved detector of the variable reluctance type generally described and shown in my copending application Serial No. 550,354, filed December 1, 1955, of which the present application is a continuation-in-part.

For purposes of uniform terminology, the term hydrophone will be applied hereinbelow to a whole pressure-sensitive unit enclosed in a housing and connected to a conductor cable on which it can be lowered into a well, or immersed or trailed in the sea or other large body of water, for example, from a moving or stationary boat. The term detector or transducer will be applied to the particular unit within a hydrophone which translates pressure pulses into electrical signals.

Briefly, the system of my copending application Serial No. 550,354 comprises a geophysical conductor cable or streamer element provided with a plurality of hydrophones carried thereon at suitable intervals and mechanically and electrically connected thereto.

Each hydrophone comprises a suitable, preferably streamlined guard or housing member, which may conveniently consist of two halves clamped to each other and to the cable. Arranged within the housing is a variable reluctance detector comprising a fluid filled chamber separated from the well or the sea fluid by a flexible diaphragm.

The flexible diaphragm transfers the pressures in the surrounding fluids, such as borehole fluids or sea fluids, to the adjacent portions of the fluid within the chamber. Inside the chamber, a partition that incldues a transducer diaphragm divides the interior of the chamber into an outer compartment which is directly responsive to the surrounding fluid pressures, and an inner compartment which is responsive only to the pressures in the outer compartment. The transducer diaphragm comprises an element made of a flexible magnetic material which is arranged to form a part of the partition and to extend close to the pole pieces of a coil-wound magnet. As the pressure fluctuations created by acoustic energy reach the detector, they are transmitted through the first flexible diaphragm to the fluid in the outer compartment. The pressure fluctuations within the outer compartment cause the diaphragm to press against the fluid in the inner compartment and to move in relation to the magnet. The movement of the magnetic material through the magnetic field produces electromotive forces or electrical signals representative of the acoustic energy reaching the detector. These E.M.F.'s are picked up by the coil-windings and conveyed to suitable indicating units.

In detectors of the above type, relatively large and slow ("static") deflections of the transducer diaphragm are caused by changes in the static pressures of the surrounding fluids, such as the pressure increases that accompany the lowering of the detectors into deep wells. Unless the pressures in the inner compartment and outer compartment are equalized, large differences in the pressures within the compartments may damage the transducer diaphragm.

In the detector of my copending patent application, Serial No. 550,354, filed December 1, 1955, the means for equalizing such differences in pressure comprise leakage means permitting a slow flow of fluid between the compartments, involving a perforation in the transducer diaphragm, or a transducer diaphragm mounting arranged so that the diaphragm serves as a magnetically-biased valve capable of being opened by an excess of pressure in the inner compartment. The diaphragm is mounted so that when the pressures in both compartments are equal, the attraction of the magnet seats the diaphragm in a fluid tight manner on the partition. When the pressure in the inner compartment exceeds that in the outer compartment, the fluid can lift the diaphragm off its seat and flow around its periphery.

An object of the present invention is to provide an improved detector of the above type which eliminates all leakage means that provide a path for a continuous fluid flow across the plane of the transducer diaphragm, said improved detector comprises magnetically-biased valve means for compensating for the effects of static pressure variations by permitting intermittent fluid flows in either direction between the inner and outer compartments.

It is also an object of this invention to provide a detector of the type defined above comprising at least two diaphragms forming a partition interposed between two chambers filled with pressure fluid, said diaphragms being arranged so that any excess of static pressure in either of said chambers cause one of said diaphragms to move from its normal position to permit a relatively rapid pressure-equalizing flow between said chambers.

It is also an object of this invention to provide a detector of the type defined above, wherein the equalization of pressure between the two chambers is greatly speeded up without sacrifice of sensitivity and wherein the response to low frequency pressure pulses is actually improved by said use of a two-diaphragm arrangement.

These and other objects of the present invention will be understood from the following description taken with reference to the attached drawings, in which:

Figure 1 is a diagrammatic cross sectional view of an embodiment of the present invention in which two flexible magnetic diaphragms of two self-excited, variable reluctance transducers serve both as transducer diaphragms and as magnetically-biased valves;

Figure 2 shows an enlargement of a portion of the apparatus of Figure 1;

Figure 3 shows a cross sectional view, along a line 3—3 of Figure 5, of an embodiment in which the magnetically-biased valve means and the transducer diaphragm are independent elements, a part of the energizing and recording system being likewise shown in said figure;

Figure 4:
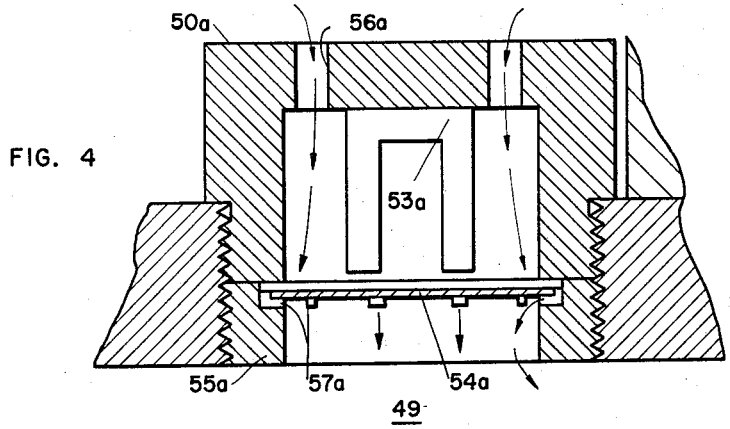
Figure 4 shows an enlarged portion of the apparatus of Figure 3.

Referring to Figure 1, the detector comprises a preferably cylindrical case 11, made of plastic material or a non-magnetic metal such as copper, aluminum, etc. The case 11 is adapted to be held within a generally streamlined guard housing, and to be electrically connected to a geophysical multiconductor cable by means of insulated connector leads 13 and 15. Said guard housing and geophysical cable form no part of the present invention, but are fully described and shown in my copending application Serial No. 550,354. The case 11 is closed at or near one end by a transverse wall or partition 17, affixed thereto in any suitable manner, as by soldering, welding, or formed integrally therewith, as shown in the drawing. The case 11 may have an axial length such as about six inches and a diameter such as two inches. The case 11 is closed at or near its other end by a second partition or diaphragm 19, held between two retainer rings 21 and 23, screwed into the case 11. The diaphragm 19 is made of a suitable flexible material, such as rubber, synthetic rubber, plastic, etc. The outer face of the diaphragm 19 is in contact with any well fluids, sea water or other liquids in which the apparatus may be immersed, the function of said diaphragm being to protect the inner detector elements within the case 11 from direct contact with said outside liquids while transmitting the desired pressure fluctuations or variations. Securely held within the case 11, as between the ring 23 and a shoulder 25 on the inner wall of the case, is a wall such as a spider generally shown at 27, comprising two preferably cylindrical cage elements 29a and 29b extending in opposite directions from the central horizontal plane of the spider 27. Suitably held within the cage 29a is a magnet structure comprising a magnetic yoke 31a preferably having two permanently magnetized pole pieces 33a and 35a provided with pick-up coil windings 37a and 39a, which comprise a large number of turns of fine, suitably insulated wire diagrammatically indicated at 37a and 39a.

Freely supported in a suitable recess within the cage 29a is a thin, flexible, preferably circular diaphragm 40a, made of a magnetic material and serving as an armature for the magnet 31a. The diaphragm 40a may have a somewhat thickened central portion 41a. The diaphragm 40a is supported within the cage 29a in such manner that when, under normal conditions, the rim of the diaphragm rests and is supported on a projecting lower ledge of the cage 29a under the effect of the force of gravity and the attraction of the permanent magnet 31a, the central portion 41a lying close to, but not quite in contact with the pole pieces 33a and 35a of the magnet.

When the pressure in compartment 49 exceeds the pressure in compartment 47, the fluid forces the diaphragm away from its seat on the lower ledge in cage 29a, and flows around the periphery of the diaphragm. As is shown in Figure 2, the diaphragm supporting ledges can be notched or grooved to facilitate the flow of fluid around the diaphragm in its lifted-off position. Similar fluid passageways such as slots, notches or grooves can be provided along the edge and top of the diaphragm.

Figure 6:
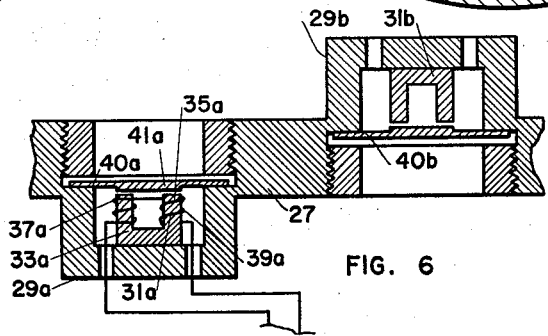
Figure 6 shows a variation in the circuit of the apparatus of Figure 1.

The cage 29b contains a device formed of magnet and coil elements identical with those of cage 29a, the coils of the two devices being connected in series and led through insulated bushings 43 and 45 to the connector leads 13 and 15, by means of which they can be connected to the main geophysical cable and its circuits. In some cases, however, it may be sufficient and desirable to provide only one of the yokes 31 with a coil winding, as shown in Figure 6.

The resilient magnetic diaphragm 40b within the cage 29b is arranged so that, under normal conditions and for purposes to be described hereinbelow, its rim is held pressed against the upper ledge of a recess in the cage 29b by the magnetic attraction of the magnet 31b and against the effect of the force of gravity, as shown in the drawing. The cage 29b can be grooved and notched in the manner shown with regard to cage 29b in Figure 2.

The space 47 between the rubber diaphragm 19 and the magnetic diaphragms 40a and 40b, as well as the space 49 on the other side of said diaphragms is filled with a fluid such as a synthetic oil, for example, a silicone oil or a suitable refined hydrocarbon oil.

The operation of the present detector may be briefly summarized as follows.

Rapid pressure variations accompanying seismic or acoustic waves cause a flexing motion of the diaphragms 40 and corresponding variations of magnetic flux in the gaps between said diaphragms and the permanent magnet pole pieces 33 and 35. These flux variations induce voltages in the pickup coils 37 and 39, and these are transmitted to the surface through the cable as signals to be amplified and recorded.

Since, however, besides rapid seismic or acoustic pressure variations, the present detector is subjected to slow pressure variations due, for example, to variations of static pressure with changing depths at which the detector may be operated, means are provided for a relatively rapid neutralization of the effect of these variations, which otherwise may affect the magnetic circuit constants and the response accuracy of the detector. More particularly, these means comprise the two-diaphragm system hereindescribed and illustrated. Thus, if the hydrostatic pressure in a well or other body of liquid surrounding the hydrophone increases, thereby putting additional pressure on the liquid in the upper chamber 47, this excess pressure will move the magnetic diaphragm 40b away from the magnet 31b and permit a leakage around its edge which will rapidly tend to equalize the pressure in chambers 47 and 49. If, on the other hand, the static pressure outside the hydrophone decreases, as happens, for example, when the hydrophone is moved upwardly in a well, the pressure in compartment 47 is relieved, and the resulting excess of pressure in compartment 49 lifts the diaphragm 40a and again equalizes the pressure in the two compartments. In all cases, the diaphragm is freely held by retainer means shown in the drawing in such a manner as to remain within the attraction field of the magnet even when it is in its lifted or off-seat position.

Figure 5:
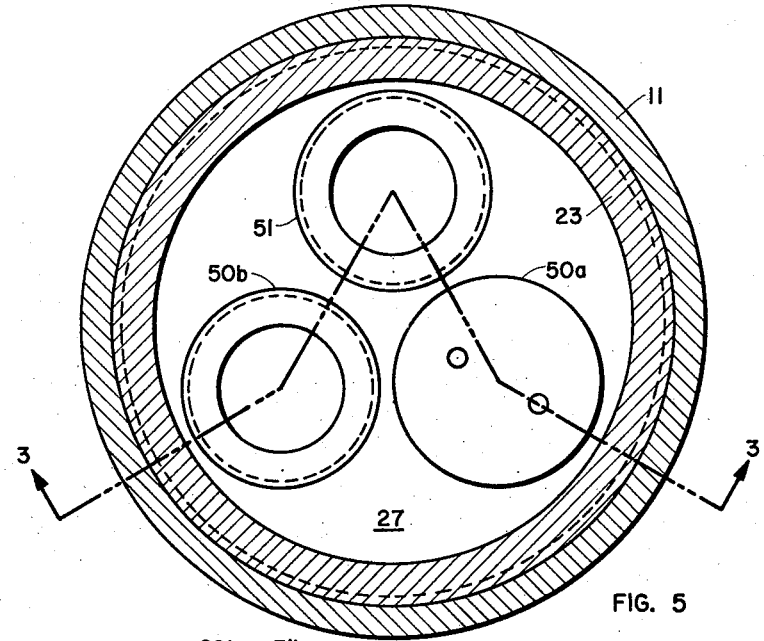
Figure 5 shows a plan view of a portion of the apparatus of Figure 3.

Further embodiments of the present invention are shown in Figures 3, 4 and 5. Referring to Figure 3, the spider 27 comprises a partition dividing the fluid-filled chamber into an outer compartment 47 and inner compartment 49. This partition supports three cylindrical cage elements 50a, 50b, and 51. The arrangement of these cage elements within the spider is shown in plan view in Figure 5.

The cages 50a and 50b each support a magnet, 53a and 53b, having pole pieces nearly in contact with the disks 54a and 54b, made of or comprising a magnetic material. The magnets are arranged to draw the disks toward the cages, so that the disks seat fluid-tightly against the cage rims. Retainer rings 55a and 55b are mounted adjacent to the disks and arranged to allow the disks to move away from the cage for short distances within the field of the magnets.

When the disks move away from their seats, as shown in Figure 4 with regard to cage 50a and disk 54a, the fluid flows from the outer compartment 47 to the inner compartment 49 through the passage 56a in cage 50a and the slot 57a in retainer ring 55a. An analogous flow from compartment 49 to compartment 47 occurs when disk 54b in cage 50b is lifted by fluid pressure.

The cage 51 supports a flexible magnet diaphragm 58 which is clamped fluid-tightly against the cage rim by ring 59 so that it forms a part of the partition separating the inner and outer compartments. Within cage 51 a yoke 60, which is composed of a soft magnetic material, is mounted with its pole pieces nearly in contact with the diaphragm 58. A pickup coil winding 61 surrounds the pole pieces and extends through holes 62 in the cage, through the inner compartment 49, through suitable fluid-tight bushings in the compartment wall, in the manner generally shown in Figure 1, and is electrically connected to a frequency modulated oscillator 63. The oscillator 63 is connected in series with discriminator 64, and a low frequency recorder 65, which can be located in a convenient locality, such as the surface area near a well.

In operation, increases in the static pressure of the liquid surrounding the detector cause corresponding pressure increases in the outer compartment 47. When a pressure difference between compartment 47 and 49 causes the fluid in the outer compartment to push disk 54a toward the inner compartment, the fluid flows around the periphery of the disk until the pressures within the compartments are equalized. Where the disks 54 form magnetically-biased valves that are independent of the transducer deiaphragm, the rigidity of the disks is preferably such that they do not bend in response to forces insufficient to lift them off of their seats. The disks can be constructed of magnetic material or can be constructed of a material such as a plastic that contains a portion of magnetic material such as iron or steel.

When acoustic energy reaches the detector, high frequency pressure fluctuations are transmitted through the flexible diaphragm 19 to the fluid in the outer compartment 47. These fluctuations cause the pressure within compartment 47 to momentarily exceed the pressure within compartment 49. The magnetic attraction between the magnets 53 and the disks 54 is chosen so that it slightly exceeds the force applied to the disks by the momentary pressure fluctuations created by acoustic waves of the maximum strength to be detected. The strength of the magnets, the amount of magnetic material contained in the disks, and the spacing between the magnets and the disks can be widely varied, as long as the magnets and disks form magnetically-biased valves that are unresponsive to the acoustic waves, but are responsive to pressure differences capable of damaging the flexible diaphragm of the transducer.

In the detector shown in Figure 3, the momentary pressure fluctuations created by acoustic energy, causes fluctuations of a flexible magnetic transducer diaghragm 58. When this diaphragm assumes a position closer to or farther from coil-wound yoke 60, the change in the relative positions of the magnetic diaphragm and the magnet yoke changes the impedance of the coil circuit. Changes in the impedance of the coil circuit cause corresponding changes in the frequency of the output of the frequency modulated oscillator 63. The discriminator 64 converts the frequency variations of the oscillator output into an alternating current containing corresponding amplitude variations; and the low frequency recorder reproduces the discriminator output as a trace having fluctuations corresponding to the amplitude variations in the discriminator output. The transducer of Figure 3 is thus an externally-excited transducer.

It will be seen that the present invention provides a detector in which the deflection of the transducer diaphragm provides substantially the only way in which the energy of the acoustically induced momentary pressure fluctuations in the outer compartment can be transferred to the fluid in the inner compartment. In detectors of this type, even a capillary leakage between the compartments can permit a transfer of an appreciable amount of the energy created by acoustic waves having a relatively low frequency. In particular, the embodiment of Figure 3 provides a detector in which the magnetically-biased valve means for equalizing static pressure differences between the inner and outer compartments may be independent of the transducing element.

The present detector is particularly suitable for the detection of low frequency acoustic energy. The pressure fluctuations created by low frequency acoustic energy have a relatively long duration, and their detection by a detector of the above type necessitates a relatively high degree of compliance in the fluid that is contained within the inner compartment. This high degree of compliance can be obtained by incorporating within the inner compartment a relatively large volume of a fluid of the type usually employed in such detectors, and/or by incorporating within the inner compartment of the present device a gas pocket or a gas bubble trapped within the inner compartment, behind the transducer diaphragm, in a manner preventing its migration into the outer compartment, as described in my copending application Serial No. 550,354. Where the inner compartment contains a relatively highly compliant fluid, a relatively large volume of fluid must flow between the inner and outer compartments to equalize static pressure differences. The magnetically-biased valves open in response to a force which must initially be relatively high in order to cause any movement of the valves, and then further open with a minimum of force; they are therefore particularly adapted for equalizing the pressures by intermittent fluid flows, of a selected relatively high rate, that can occur only in response to pressure differences that exceed a selected level.

The transducer employed in the present detector can be a variable reluctance transducer of the externally excited type described in connection with Figure 3. This type of transducer is particularly suited for transducing low frequency acoustic energy, since the strength of the electric signal is affected only by the nearness of the transducer diaphragm to the coil-wound magnetic yoke which may or may not be permanently magnetized. In the self-excited type of variable relutcance transducer described in connection with Figure 1, the strength of the electric signal decreases with decreases in the speed by which the magnetic diaphragm moves through the field of the permanent magnet; and a low frequency acoustic wave produces a weaker signal than a high frequency acoustic wave. It is however understood that the detector of Figure 1 can be used as an externally excited transducer when connected to a suitable circuit similar to that of Figure 3.

Since, as described with regard to Figure 3, the pressure equalizing means may comprise magnetically-biased valves with diaphragms having functions independent from those of the transducer diaphragm, the transducer itself may be of any type comprising a fluctuation-responsive diaphragm adapted to form a fluid-tight closure. The transducer can, for example, comprise a piezoelectric, electrostrictive or other element, connected as described hereinabove in such a manner that the fluctuations of a flexible diaphragm forming part of the partition separating the inner and outer compartments, cause the element to generate a fluctuating electric signal.

I claim as my invention:

1. In a hydrophone adapted to be connected to a conductor cable for operation in a submerging fluid, a chamber adapted to be filled with an insulating fluid, a wall dividing the chamber into two compartments, one of the compartments having a resilient partition separating it from the submerging fluid, said wall having therethrough three openings, diaphragms of magnetic material normally closing said openings, one of said diaphragms being fixedly sealed to said wall to form a permanent closure, and two of said diaphragms being movably positioned over said openings on opposite sides of the wall, magnet means in register with each of said diaphragms, said magnet means being adapted to hold the movable diaphragm against said wall to maintain the corresponding opening closed, an excess of pressure in one of said compartments acting to press one of said movable diaphragms against the wall, and to move the other movable diaphragm away from the wall against the pull of the magnet means to permit a pressure equalizing flow around the edges of said movable diaphragm, each of the magnet means comprising a yoke having pole faces adjacent one of the diaphragms, the yoke of the magnet means adjacent the fixedly sealed diaphragm being provided with a winding electrically connectable with said cable, whereby electromotive forces generated in said winding by pressure responsive diaphragm fluctuations are transmitted along the cable.

2. An acoustic wave detector comprising a transducer diaphragm adapted to convert pressure fluctuations into electric signals, a chamber filled with an insulating fluid and separated from the surrounding fluid by a flexible diaphragm, a wall comprising said transducer diaphragm dividing said chamber into an outer compartment responsive to the pressures of the surrounding fluid, and an inner compartment responsive only to the pressures in the outer compartment means for equalizing static fluid pressure differences between the two compartments comprising conduit means in fluid communication between the inner and the outer compartments, closure elements of magnetic material arranged to seat releasably and fluid tightly against the openings of said conduit means in each of said compartments, magnet means mounted adjacent each closure element for urging said element into its seated position, retainer means mounted adjacent each closure element and arranged to permit said element to be lifted off its seat to allow fluid flow through the conduit while retaining the unseated element within the attraction field of the adjacent magnet means, the force of said field being selected so that the closure elements are lifted off their seats in response to pressure differences between the inner and the outer compartments which are greater than pressure differences resulting from acoustic waves and are less than pressure differences capable of damaging the transducer diaphragm.

3. The detector of claim 2, wherein the transducer comprises at least one self-excited variable reluctance transducer, the flexible diaphragm of which is arranged to serve as a magnetically-seated closure element.

4. The detector of claim 2, comprising an externally-excited variable reluctance transducer.

5. The detector of claim 2, wherein the closure elements for the conduits are structures which are rigid with respect to the pressure differences created by the acoustic energy to be detected.

6. An acoustic wave detector comprising: a transducer diaphragm adapted to convert pressure fluctuations into electric signals, a chamber filled with an insulating fluid and separated from the surrounding fluid by a sound transparent wall, a partition including said transducer diaphragm dividing said chamber into an outer compartment responsive to the pressures of the surrounding fluid, and an inner compartment responsive only to the pressures in the outer compartment, means for equalizing static fluid pressure differences between the two compartments comprising conduit means in fluid communication with the inner and the outer compartments, magnetic biased closing means for said conduit means, the force of said magnetic biased closing means being selected so that said closing means opens in response to static pressure differences between said inner and outer compartments which are greater than the pressure differences resulting from acoustic waves.

7. Claim 6 wherein the closing means comprise the transducer diaphragm and a flexible diaphragm formed of magnetic material and disposed to close the openings in the partition, a pair of magnet means disposed to hold said diaphragms against said partition, an excess of pressure in one compartment acting to press one of said diaphragms against said partition to maintain the corresponding opening closed and to move the other diaphragm away from the partition to permit a pressure equalizing flow around the edges of said movable diaphragm and a winding disposed on at least one of said magnet means.

8. Claim 6 wherein the closing means comprise the transducer diaphragm and a flexible diaphragm formed of magnetic material and disposed to close openings in the partition, one of said diaphragms being disposed to permit flow in one direction between the inner and outer compartments and the other diaphragm being disposed to permit flow in the other direction; a pair of magnetic yokes disposed with their poles adjacent said diaphragms and a winding on at least one of said yokes.

9. Claim 8 wherein both yokes are provided with windings connected in series, with the windings being disposed to make the effects of pressure deflections of said diaphragms additive in inducing currents in said windings.

References Cited in the file of this patent
UNITED STATES PATENTS

| 2,191,121 | Slichter | Feb. 20, 1940 |
| 2,429,104 | Olson | Oct. 14, 1947 |
| 2,460,076 | Emerson | Jan. 25, 1949 |
| 2,627,183 | Greenwood | Feb. 3, 1953 |